United States Patent
Berneis et al.

(10) Patent No.: US 6,838,858 B2
(45) Date of Patent: Jan. 4, 2005

(54) POWER MANAGEMENT SYSTEM AND METHOD FOR AN AUTOMOBILE

(75) Inventors: Paul Allen Berneis, Dexter, MI (US); Borys Joseph Melnyk, Allen Park, MI (US); Thomas J. Bray, Saline, MI (US); Jeff Matson, White Lake, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/273,465

(22) Filed: Oct. 18, 2002

(65) Prior Publication Data

US 2003/0085689 A1 May 8, 2003

Related U.S. Application Data

(60) Provisional application No. 60/338,851, filed on Oct. 29, 2001.

(51) Int. Cl.[7] ................................................. H02J 7/00
(52) U.S. Cl. ....................................... 320/135; 320/104
(58) Field of Search ................................ 320/135, 104, 320/106, 109, 132, 139; 367/9.1, 10.1

(56) References Cited

U.S. PATENT DOCUMENTS

| | | | |
|---|---|---|---|
| 3,763,415 A | 10/1973 | Ownby | 307/10.1 |
| 4,082,992 A | 4/1978 | Day | 320/117 |
| 4,114,082 A * | 9/1978 | Scheidler | 320/117 |
| 4,161,684 A * | 7/1979 | Ragaly | 320/116 |
| 4,347,473 A * | 8/1982 | Stroud | 320/126 |
| 4,864,154 A | 9/1989 | Copeland et al. | 307/10.7 |
| 5,162,720 A * | 11/1992 | Lambert | 320/104 |
| 5,264,777 A * | 11/1993 | Smead | 320/126 |
| 5,548,200 A * | 8/1996 | Nor et al. | 320/109 |
| 5,659,289 A | 8/1997 | Zonkoski et al. | 340/438 |
| 6,009,363 A | 12/1999 | Beckert et al. | 704/33 |
| 6,175,789 B1 | 1/2001 | Beckert et al. | 704/33 |

FOREIGN PATENT DOCUMENTS

FR 2 270 876 12/1975

* cited by examiner

*Primary Examiner*—Pia Tibbits
(74) *Attorney, Agent, or Firm*—Brinks Hofer Gilson & Lione

(57) ABSTRACT

A system and method for managing a vehicle's electrical power consumption are disclosed. The vehicle has a plurality of electrical components. The electrical components have varying power requirements. The system of the present invention includes a first battery for supplying power to at least one of the plurality of electrical components and a second battery for supplying power to at least one other of the plurality of electrical components. Further, an isolator is provided for electrically isolating the first battery from the second battery. A power supply for supplying a regulated supply of electrical power and a power distributor in communication with at least one of the first and second batteries for selectively providing electrical power to the plurality of electrical components are also provided. Finally, the system has a processor in communication with the power supply and the power distribution box, the processor is configured to execute source code for managing the vehicle's electrical power consumption.

22 Claims, 3 Drawing Sheets

POWER MANAGEMENT SYSTEM AND METHOD FOR AN AUTOMOBILE

CROSS-REFERENCE TO RELATED APPLICATIONS

The present invention claims priority to U.S. Provisional Serial No. 60/338,851 filed on Oct. 29, 2001, entitled "Power Management System And Method For An Automobile."

TECHNICAL FIELD

The present invention relates to power management systems and methods in automobiles for conserving and controlling the power consumption by various appliances and devices located within a vehicle.

BACKGROUND

Emergency vehicle appliances (light bars, sirens, radios, computers, etc.) draw a considerable amount of electric power. If the appliances are inadvertently left running while the engine is off, it is possible to discharge the battery to the point that battery cannot start the engine. This happens not infrequently, and requires a service call to start the engine which will then recharge the battery.

In a vehicle that has computer equipment installed, a second problem occurs. Computers can lose information if power is abruptly cut off and computers take time to boot-up. Thus, it would be desirable to leave the computers up as long as possible.

In conjunction with the second problem, if a computer is powered up when the vehicle is shut down, the computer must then keep running when the vehicle is restarted. During engine crank, the system voltage drops well below the voltage required to keep most computers (and other electronic equipment) from crashing unless special (and therefore expensive) power supplies are used in the equipment.

Therefore, what is need is a new and improved power management system and method to address these problems. The new and improved power management system and method should protect the engine battery from being discharged by the appliances. Further, the new and improved system and method should prevent any onboard computers from crashing when the engine is being cranked, without the use of special power supplies.

SUMMARY

A system for managing a vehicle's electrical power consumption is provided. The vehicle has a plurality of electrical components. The electrical components have varying power requirements. The system of the present invention includes a first battery for supplying power to at least one of the plurality of electrical components and a second battery for supplying power to at least one other of the plurality of electrical components. Further, an isolator is provided for electrically isolating the first battery from the second battery. A power supply for supplying a regulated supply of electrical power and a power distributor in communication with at least one of the first and second batteries for selectively providing electrical power to the plurality of electrical components are also provided. Finally, the system has a processor in communication with the power supply and the power distribution box, the processor is configured to execute source code for managing the vehicle's electrical power consumption.

In an embodiment of the present invention, the system further includes an override switch for bypassing the isolator and electrically connecting the first and second batteries.

In another embodiment of the present invention, the system further includes an alternator in communication with the first and second batteries for electrically charging same.

In yet another embodiment of the present invention, the alternator is connected to the isolator such that the first and second batteries are selectively charged.

In yet another embodiment of the present invention, the power supply further includes a plurality separate power supply portions that may be independently activated and deactivated.

In yet another embodiment of the present invention, the plurality separate power supply portions further includes a processor power supply portion for supplying power to the processor.

In yet another embodiment of the present invention, a vehicle control module in communication with the processor and the power distributor is provided, wherein the processor manipulates the vehicle control module to output a control signal to the power distributor to change the vehicle's power consumption.

In still another embodiment of the present invention, a vehicle status indicator in communication with the processor is provided for communicating a vehicle status thereto.

In still another embodiment of the present invention, the vehicle status indicator is in communication with the power supply for receiving electrical power there from.

In yet another embodiment of the present invention a method for managing a vehicle's electrical power consumption is provided. The vehicle has a plurality of electrical components, and the electrical components have varying power requirements. The method includes supplying power to at least one of the plurality of electrical components using a first battery, supplying power to at least one other of the plurality of electrical components using a second battery, electrically isolating the first battery from the second battery using an isolator, supplying a regulated source of electrical power using a power supply, selectively providing electrical power to the plurality of electrical components using a power distributor in communication at least one of the first and second batteries, and manipulating the power distributor by executing source code on a processor configured to manage the vehicle's electrical power consumption, wherein the processor is in communication with the power supply and the power distributor.

Further aspects, features and advantages of the present invention will become apparent from consideration of the following erudite description and the appended claims when taken in connection with the accompanying drawings.

DETAILED DESCRIPTION

Figure 1:
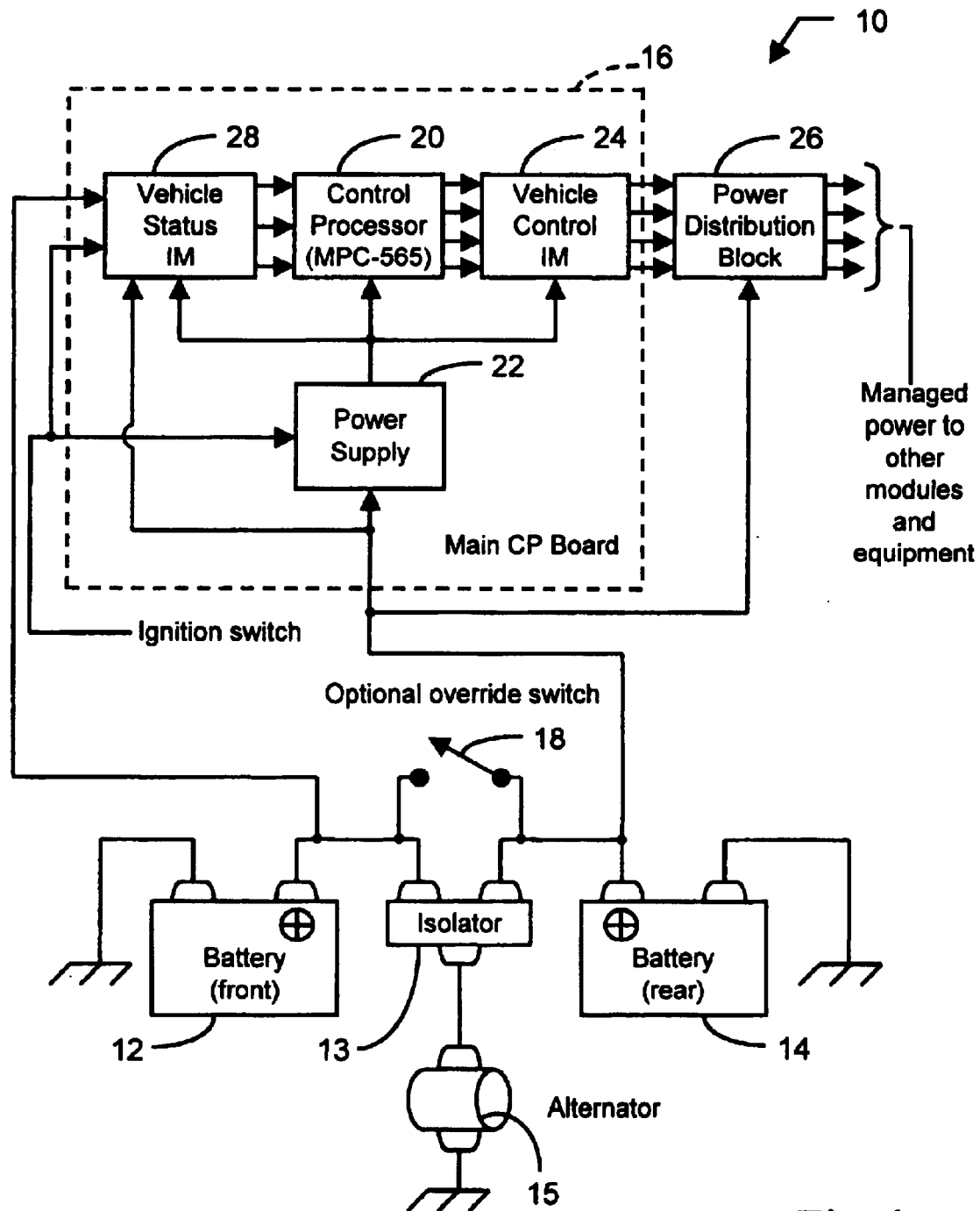
FIG. 1 is a block diagram of a vehicle having a power management system, in accordance with the present invention.

With reference to FIG. 1, vehicle having a power management system 10 is illustrated, in accordance with the present invention. The present invention provides system 10 that prevents a front battery 12 from draining down to a point where it cannot start the car, insures critical functions (e.g., light bar) are available as soon after the user turns the key as possible (five seconds maximum), insures all other functions are available as soon as possible thereafter, isolates vehicle sub-systems from problems caused by low voltage during engine crank, eliminate or greatly reduces sub-system startup time when the vehicle has been idle for only a short period of time.

In the foregoing detailed description of the present invention, power management system 10 in the context of an emergency vehicle such as a police cruiser. Of course, the present invention including power management system 10 is useable in other vehicle environments.

To accomplish this, in an embodiment of the present invention two strategies are utilized. The first strategy as illustrated in FIG. 1, is to use two batteries. The front battery 12 (engine compartment) supplies power to all of the usual vehicle systems: the engine, heating/air conditioning, instrument panel, headlamps, taillights, etc. A rear battery 14 (trunk) supplies power to a vehicle sub-system 16 and to all of the police equipment (light bar, siren, etc.) that the vehicle sub-system controls. Batteries 12 and 14 are isolated from each other using a conventional isolator 13. Thus, if the vehicle sub-system equipment drains rear battery 14, front battery 12 remains charged and able to start the engine. Furthermore, if the reverse direction, the system voltage drops when the engine is cranked the potential disruption caused by the voltage drop is limited to front battery 12 and does not affect vehicle sub-system 16 equipment. An optional override switch 18 allows the vehicle to be started using rear battery 14 in the event of a front battery 12 failure. To separately charge batteries 12 and 19, a conventional alternator 15 is electrically connected to isolator 13 thereby selectively connected to each battery 12, 14.

In another embodiment, an alternate power management strategy is to keep the system operational during short periods when the engine is not running. This strategy allows the system to be used immediately without waiting for the computers to boot up. During this period the vehicle sub-system 16 monitors the battery status and powers down the system in stages as the power down period continues.

Figure 2:
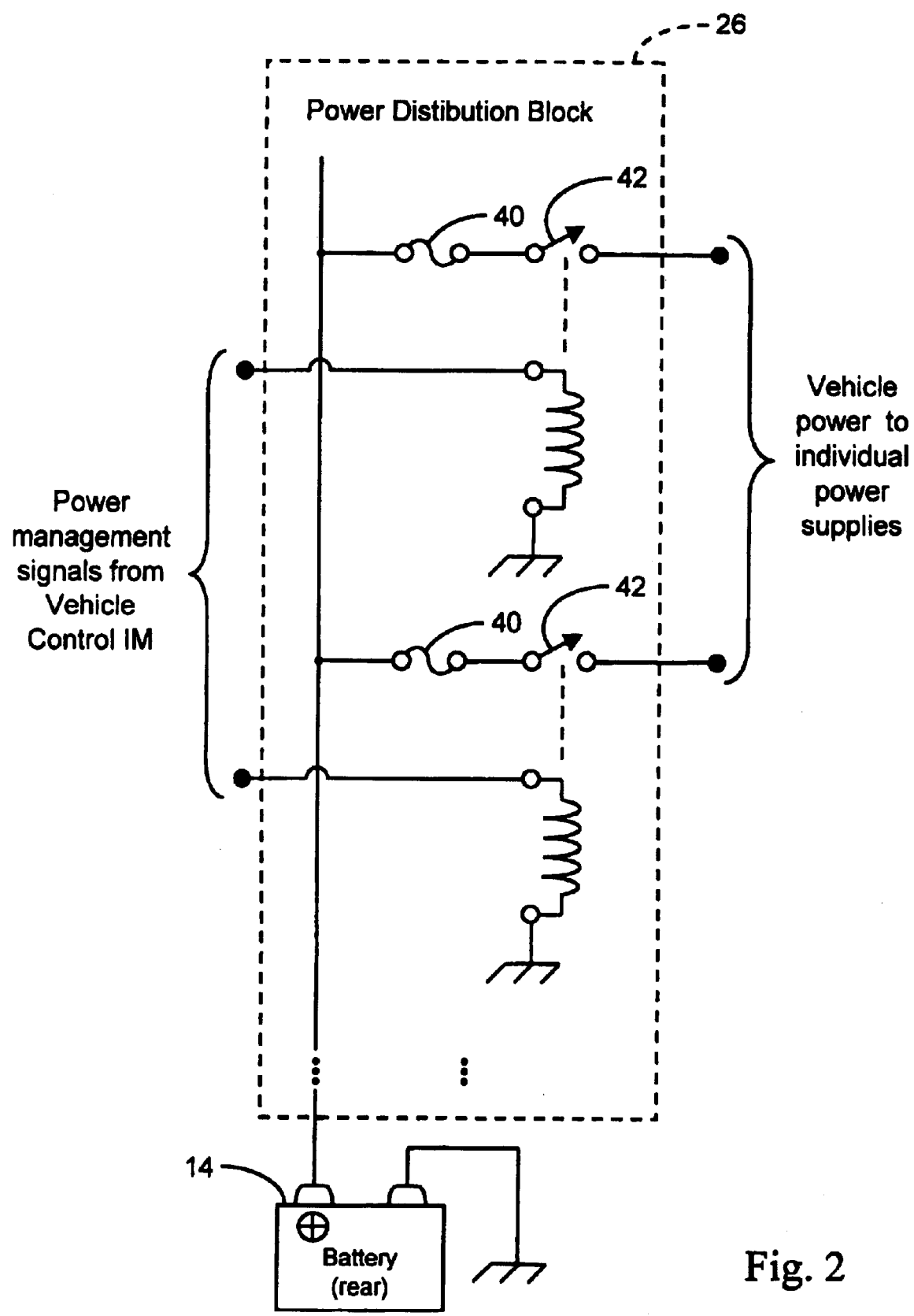
FIG. 2 is a block diagram of the power distribution box dividing the incoming battery power into a set of individually fused and relay controlled branch circuits, in accordance with the present invention.

With continued reference to FIG. 1, the components of the power management system are illustrated, in accordance with the present invention. A MPC-565 processor or similar control processor 20 may be used to implement the power management system and method of the present invention. Control processor 20 executes program or software code to determine which subsystems should be powered at any given time. A power supply 22 that powers control processor 20 is activated when the vehicle is turned on or the ignition switch is moved to the accessory position. Once power supply 22 is on, control processor 20 keeps power supply 22 on even when the vehicle is powered off. Control processor 20 determines which other subsystems should be powered at any time, and controls the power to those subsytems. A vehicle control interface module 24 or similar device, in turn, switches power on and off to a power distribution box 26. The power distribution box 26 divides the incoming battery power into a set of individually fused 40 and relay 42 controlled branch circuits, as illustrated in FIG. 2. However, relays 42 may be mechanical or solid state relays.

A vehicle status interface module 28 or similar device completes the set of power management system 10 hardware components. The vehicle status interface module 28 provides the input data to the control processor (MPC-565) that allows the power management system 10 to make decisions regarding which subsystem should be powered up. The vehicle status interface module 28 also provides information about battery voltages, whether or not the engine is running, etc.

Figure 3:
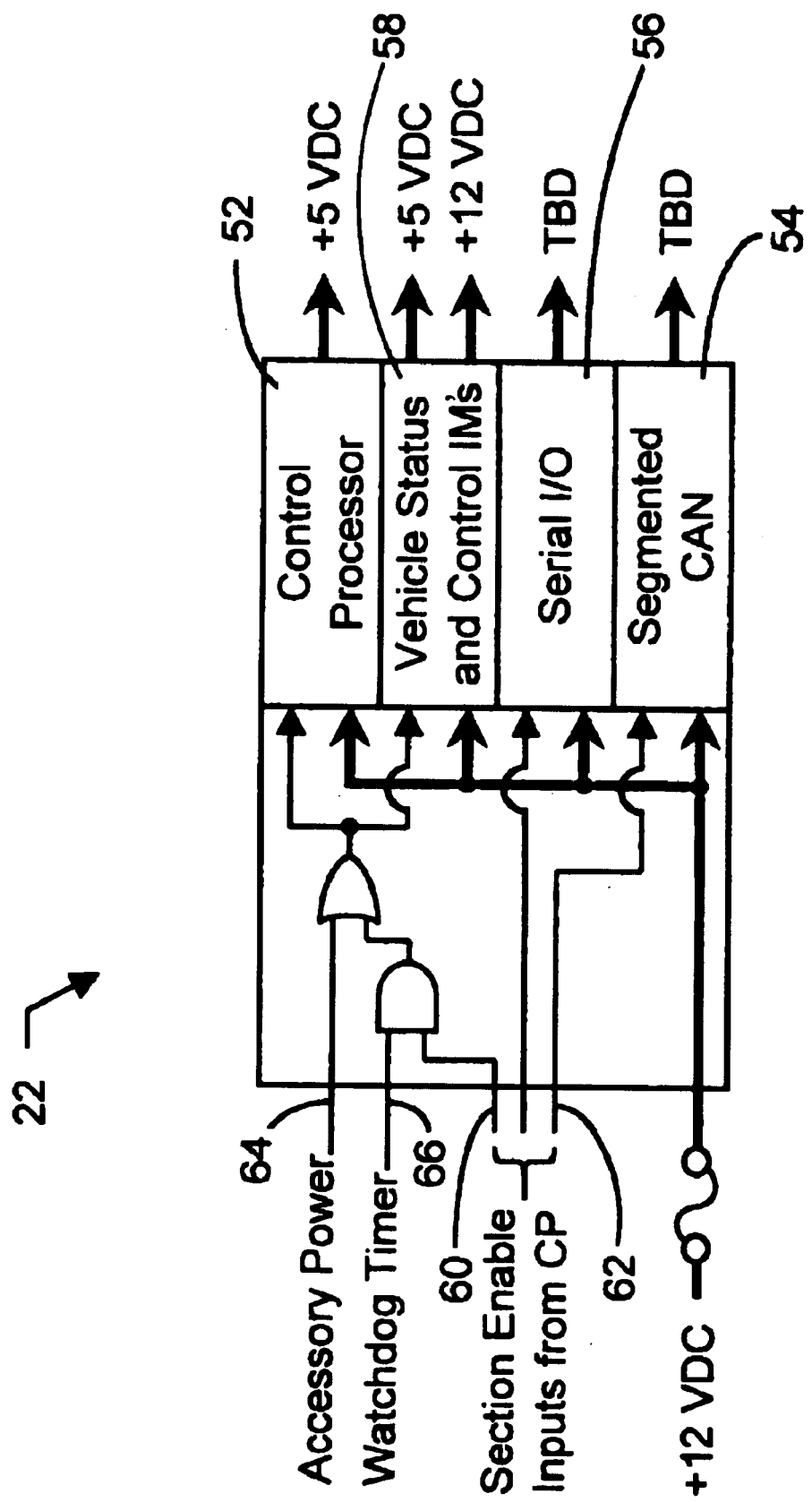
FIG. 3 is a block diagram of a power supply having four separate sections that supply power to the power management circuits, in accordance with the present invention.

In an embodiment of the present invention as illustrated in FIG. 3, a power supply system 50 is provided. The power supply system 50 includes four separate sections that supply power to circuits on main CP board 16: a CP power supply section 52, a segmented CAN Network power supply section 54, a serial I/O power supply section 56, a vehicle status and control IMs power supply section 58.

With continuing reference to FIG. 3, the configuration of power supply 50 is illustrated. Each section 52, 54, 56 and 58 of the power supply has an enable signal 60, which turns the section on and off. Two of the sections power I/O subsystems: segmented CAN 54 and serial I/O 56. CP 20 directly controls the enable signals, disabling sections as needed to conserve battery power. The remaining two sections, the CP power supply section 52 and the vehicle IM power supply section 58, have a more complicated control strategy, which is described below.

CP and vehicle IM power supply sections 52 and 58 are controlled as a pair. CP 20 monitors battery voltages and engine status (running or not) to make the decisions necessary to control the power supplies. CP 20 controls power to other subsystems in the vehicle (i.e., light bar, siren controller, etc.). Thus, CP 20 always needs the vehicle IMs, so there is no reason to control their power separately.

The CP power supply section 52 is controlled by three sources: a CP input 62, an ignition switch 64, and a watchdog timer 66.

The ignition switch 64 provides an accessory power signal. Power is provided whenever switch 64 is in the accessory, run, or start position. The accessing power signal is used to turn on the CP power supply section 52 when the vehicle sub-system system is off. The control sequences are:

Power supply not running, accessory power turns on—when accessory power comes on, the CP and vehicle IM sections of the power supply power up. This causes the CP to initialize, at which point the CP turns on a CP power supply enable signal, providing a second enable to the CP section of the power supply. Once initialization has completed, the CP is controlling its own power regardless of the position of ignition switch 64.

CP running, accessory power turns off—CP 20 enable signal keeps the power supply up and the CP running. The CP notices the accessory power dropping (via the vehicle status IM) and that causes CP to initiate a power staging sequence.

Watchdog timer fires, accessory power on—CP 20 halts processing. The CP power supply enable signal is disabled, but the CP power remains on because accessory power is on. None of the power supply sections changes state. As a result, the I/O devices all remain in their current state. From the system user's vantage point, the vehicle electronic equipment (i.e. light bar, siren, radios, etc.) stay in the state they were in, but can no longer be controlled. To reboot the system, the user must turn the ignition switch to the off position.

CP watchdog timer has fired expired, accessory power turns off—since the enable signal to the CP power supply is already off, turning off the ignition disables the CP power supply. This brings down the CP, which in turn brings down all of the other power supply enable signals, thus dropping power to other electrical equipment. In the police cruiser embodiment, all of the police equipment turns off (light bar, siren, radios, etc.) This returns the system to the power off state, from which turning the ignition switch back on will reboot the system, returning all of the police equipment in a just-initialized state.

Watchdog timer fires, accessory power off—the watchdog timer turns off the enable signal to the CP power supply section. Since the accessory power signal to the CP power supply is already off, the CP power supply turns off. The remainder of the sequence is the same as for the previous case.

The accessory power signal input is only used as a status input the accessory power. This signal drives a small relay so that the signal is isolated from the rest of the system. The overall power supply design must insure that there cannot be current flow through the supply between the accessory power and battery inputs because the unswitched power may be supplied by a different battery or power system than the accessory power signal.

Preferably, all the power supplies are high efficiency switching supplies to minimize heat and wasted power. The intent is that when CP 20 is running strictly on battery power (ignition is off) CP processor 20 can reduce the current requirements down to for example 500 ma while remaining fully functional, i.e. not going to sleep.

The time lag for system startup subdivides into the following sequence of events:

Power On—the ignition key is placed into accessory or run position;

Startup—the output of the power supplies are stable enough for the processors to begin running;

CP Processor Initialization Complete—at this point the human machine interface (HMI) becomes available to the system user. This includes all of the critical functions.

VACM Initialization Complete—at this point CP 20 and VACM establish communication on the ACP/SCP link, making voice commands available to the system user; and AP Initialization Complete—at this point the CP and AP establish communications across the TCP/IP link, making the graphical user interface (GUI) HMI available to the system user.

This timeline depicts, from the user's vantage point, that the switches are available first, then the voice command functions, and finally the GUI. Preferably, CP processor initialization is completion within five seconds from turning the key to starting the engine. The VACM initialization complete event should be reached shortly thereafter. The AP initialization complete depends on how fast the Windows operating system is capable of initializing.

The present invention contemplates the following steps to minimize system startup time: Dual batteries allow the startup to begin as soon as the key is turned on. The system does not need to wait for the engine to start, and no expensive power supplies are required to handle low system voltages during the engine cranking period.

The critical functions are available as soon as the CP has initialized. They do not need to wait for Windows to boot. CP 20 runs a simple real-time executive program, which requires minimal initialization.

The CP 20 boot does not run extensive diagnostics at boot time. It verifies basic functioning only. More extensive diagnostics, if required, run during idle time after CP 20 is operating.

Since startup time can only be minimized to a limited extent, system 10 of the present invention attempts to avoid restarting the system when possible. Instead of immediately shutting down when the ignition key is turned off, system 10 stays up as long as possible commensurate with the available battery power.

After the ignition key has been turned to off, system 10 goes through four stages of operation. At each stage additional steps to reduce power are taken. Thus, the time it will take to fully power back up will progressively increase.

TABLE 1

Power Shutdown Stages

| Stage | Description | Default Time Limit | Minimum Battery Voltage | Maximum Current Draw |
|---|---|---|---|---|
| 1 | short term—all functions immediately available | 10 minutes | 10 VDC | 5 A |
| 2 | medium term—critical functions immediately available | 1 hour | 9 VDC | 2 A |
| 3 | long term—critical functions available in less than 2 seconds | 12 hours | 8 VDC | 0.5 A |
| 4 | system off—critical function available in less than 5 seconds. | until turned back on | N/A | 0 A |

Table 1 shows (in column 3) the default time period, for example, system 10 remains in each stage before it automatically transitions to the next stage. These time periods may be changed as part of the configuration process. Table 1 also shows (in column 4) minimum acceptable battery voltage for each stage. If the battery voltage drops below the minimum, system 10 automatically transitions to the next stage, even if the time limit for the current stage has not been reached.

Table 1 also shows (in column 5) the maximum current draw allowed at each stage. The current limit is the total allowed from rear battery 14, including the system hardware, all external IMs, and equipment that are powered from rear battery 14 (light bar controller, two way radios, etc.).

While specific time limits, minimum voltages and maximum currents have been identified, the present invention contemplates reconfigurable time limits, voltages and currents and thus the specific values given are only one example of what the threshold may be set to. Additionally, the number of stages the system may go through in shutting down various pieces of equipment may also be increased or decreased. The four stages described are only one embodiment and may be changed accordingly.

For example, in the police vehicle environment, the following stages illustrate a typical system 10 shut down power down scenario:

Stage 1: When the officer shuts off the vehicle (i.e., the accessory power signal is off), the system enters power down stage one. At this stage all displays, panel lights, and other activity indicators are turned off. The system leaves all computer-controlled device interfaces powered up, including the AP, two-way radios, light bar, siren, HMI IMs, and other critical devices. However, computer controlled devices such as the light bar and siren are set to their off state (e.g., the light bar is left powered up, but all the lights are turned off). The two-way radios are left fully powered.

Stage 2: After the ignition has been off for ten minutes or some other predefined time period, the CP transitions to power down stage two, causing the AP to go into hibernation and any non-essential IMs to shut down. The CP 20 leaves the vehicle monitoring IM, two way radio IMs, HMI switch module IMs, as well as the main CP processor up and running. At this point the system should be drawing less than 2A which the trunk mounted battery (near battery 14) could sustain for 30 or more hours if it is in good shape.

Putting the AP into hibernation causes the AP to save its current state to disk and shut itself off. The value of putting the AP into hibernation instead of just shutting it down is that no unsaved work is lost (e.g., a partially written report). At this point, bringing the AP back online requires the AP to go through its full boot sequence, followed by reloading the saved state information.

During stage two, if the system detects the door opening, the system returns to stage one of the power down sequence. If nothing happens after the 10-minute stage one period, the system returns to stage two to finish the time remaining in that stage. If the stage two limit was exceeded while the system was back in stage one, CP 20 transitions to stage three as soon as it completes the return to stage two.

Stage 3: After one hour at stage two, system 10 powers down to stage three. This includes shutting down the radios and all HMI switch module IMs. The CP reduces its clock rate to reduce its current draw. During stage three, if system 10 detects vehicle door opening, system 10 returns to stage one of the power down sequence. If nothing happens after the 10-minute stage one period, system 10 returns to stage three to finish the time remaining in that stage (note: because the system requires an orderly shutdown, it first transitions to stage two, and as soon as that transition is complete it transitions to stage three). If the stage three limit was exceeded while the system was back in stage one, the CP transitions to stage four as soon as it completes the return to stage three.

Stage 4: After 12 hours at stage three, CP 20 shuts itself down. At this point the system requires the full power up sequence to bring the system to a fully operational level.

In an alternate embodiment of the present invention, a power management control method is provided. The control method may be implemented in hardware or software or a combination thereof. For example, executable code may be stored in an electronic memory and executed by CP 20. Generally, the power management method of the present invention monitors the input of a vehicle status interface module that indicates the status of the vehicle and then sends commands to various vehicle electronic devices to partially shut down these devices to conserve stored energy supplies.

The power management method of the present invention utilizes two state variables. A first variable tracks the power down stage of the system and the second variable tracks the power down state of the equipment. Table 2 below indicates the old state (current state) of system 10 and the physical event that may change the current state in column 1, the new state and the new equipment state in column 2 that results from the event and the action taken by system 10 in column 3. The system states are as follows: off, on, short shut down, medium shut down, and long shut down.

The power management method of the present invention uses three timers. One to time out each of the power down stages. The timers will be referred to as short, medium and long timer. Column 2 in Table 2 below shows the transition that occurs. It is implied that when the equipment stage changes, the equipment will be turned on or off to match the state. Initially, it is assumed that the timers and voltage threshold monitoring are inactive and that this system state is unknown (i.e. zero). Once the initialization is complete, both the system state and the equipment state are set to on.

With continuing reference to Table 2, column 1, row 1, indicate that the current state of the system is on and the occurring event is that the ignition is turned off. The new state of system 10 is changed to short and the new equipment state is changed to short (short shut down) and the resulting action as indicated in row 1, column 3, is that all three timers are activated and the low voltage threshold is set to the short limit. As indicated in row 2, column 1 through 3, if the ignition is on or if the accessory is on, regardless of the current state of the system, the new state is set to on and the new equipment state is also set to on. The action taken is to turn off all three timers and deactivate the low battery threshold. As indicated in row 3, column 1, if the short timer fires (expires) or the battery drops below the short limit and the current or old state is the short shut down state, the new state is changed to medium shut down and the new equipment state is changed to medium shut down. The action taken, as indicated in column 3 of row 3, is that the short timer is turned off and low voltage threshold is set to the medium limit. As indicated in row 4, column 1, when the current state or old state of the system is in the short shut down state and the battery drops below the medium limit, the new system state and equipment state is changed to the long shut down state or stage and the action, as indicated in column 3, row 4, is to turn off the short and medium timers and set the low voltage threshold to the long limit. This action is also taken when the current or old state of the system is in the medium shut down state and the battery drops below the medium limit or the medium timer fires or expires. As indicated in column 1, row 5, when the current state or old state of the system is medium shut down or long shut down and the driver side door opens, the new state will remain unchanged while the equipment state will be changed to the short shut down and the action taken will be to turn off the short timer. When the old state or current state of the system is in the medium or long shut down state and the short timer fires or expires, the new system state will remain unchanged while the new equipment state will be set to the current system state, as indicated by row 6, columns 1 and 2. Finally, when the current or old system state is in the long shut down state and the long timer fires or expires or the battery drops below the long voltage limit, then the new system state is set to off and the new equipment state is set to off.

TABLE 2

Power Management State Machine

| Old State/Event | New State/ New Equipment State | Action |
| --- | --- | --- |
| On/Ignition Off | Short/Short | Start all three timers with their specified timeout periods (currently 10 minutes, 1 hour, and 12 hours respectively). Set the low voltage threshold to the short limit (currently 10.0 volts) |
| any/Ignition On any/Accessory On | On/On | Turn off all three timers. Deactivate the low-battery threshold. |
| Short/Short Timer fires Short/Battery drops below short limit | Medium/Medium | Turn off short timer. Set the low voltage threshold to the medium limit (currently 9.0 volts) |

TABLE 2-continued

Power Management State Machine

| Old State/Event | New State/<br>New Equipment<br>State | Action |
|---|---|---|
| Short/Battery drops below medium limit<br>Medium/Battery drops below medium limit<br>Medium/Medium timer fires | Long/Long | Turn off short and medium timers. Set the low voltage threshold to the long limit (currently 8.0 volts) |
| Medium/Driver door opens<br>Long/Driver door opens | unchanged/<br>Short | Turn on short timer. |
| Medium/Short timer fires<br>Long/Short timer fires | unchanged/<br>set to current system state | |
| Long/Long timer fires<br>Long/battery drops below long limit | Off/Off | |

The present invention contemplates other user scenarios. For example, if a user opens the door while the system is in either the medium or long state and the medium or long timer expires before the short timer expires, the system will power down to the next lower state.

As any person skilled in the art of power management systems will recognize from the previous detailed description and from the figures and claims, modifications and changes can be made to the preferred embodiments of the invention without departing from the scope of this invention defined in the following claims.

We claim:

1. A system for managing a vehicle's electrical power consumption, the vehicle having a plurality of electrical components, the electrical components having varying power requirements, the system comprising:

a first battery for supplying power to at least one of the plurality of electrical components;

a second battery for supplying power to at least one other of the plurality of electrical components;

an isolator for electrically isolating the first battery from the second battery;

a power supply connected to at least one of the first and second batteries for supplying a regulated supply of electrical power to at least one of the plurality of electrical components;

a power distributor in communication with the power supply and at least one of the first and second batteries for selectively providing electrical power to the plurality of electrical components; and a processor in communication with the power supply and the power distribution box, wherein the processor is configured to execute program code for managing the vehicle's electrical power consumption by manipulating an output of the power distributor.

2. The system of claim 1 further comprising an override switch for bypassing the isolator and electrically connecting the first and second batteries.

3. The system of claim 1 further comprising an alternator in communication with the first and second batteries for electrically charging same.

4. The system of claim 3 wherein the alternator is connected to the isolator such that the first and second batteries are selectively charged.

5. The system of claim 1 wherein the power supply further comprises a plurality of separate power supply portions that may be independently activated and deactivated.

6. The system of claim 5 wherein the plurality of separate power supply portions further comprises a processor power supply portion for supplying power to the processor.

7. The system of claim 1 further comprising a vehicle control module in communication with the processor and the power distributor, wherein the processor manipulates the vehicle control module to output a control signal to the power distributor to change the vehicle's power consumption.

8. The system of claim 1 further comprising a vehicle status indicator in communication with the processor for communicating a vehicle status thereto.

9. The system of claim 8 wherein the vehicle status indicator is in communication with the power supply for receiving electrical power there from.

10. A method for managing a vehicle's electrical power consumption, the vehicle having a plurality of electrical components, the electrical components having varying power requirements, the method comprising:

supplying power to at least one of the plurality of electrical components using a first battery;

supplying power to at least one other of the plurality of electrical components using a second battery;

electrically isolating the first battery from the second battery using an isolator;

supplying a regulated source of electrical power to at least one of the plurality of electrical components using a power supply;

selectively providing electrical power to the plurality of electrical components using a power distributor in communication at least one of the first and second batteries and the power supply; and manipulating the power distributor by executing program code on a processor configured to manage the vehicle's electrical power consumption, wherein the processor is an communication with the power supply and the power distributor.

11. The method of claim 10 further comprising bypassing the isolator and electrically connecting the first and second batteries using an override switch.

12. The method of claim 10 further comprising charging the first and second batteries using an alternator in communication therewith.

13. The method of claim 12 further comprising selectively charging the first and second batteries using the alternator and the isolator.

14. The method of claim 10 further comprising outputting a control signal to the power distributor to change the vehicle's power consumption using a vehicle control module in communication with the processor and the power distributor.

15. The method of claim 10 further comprising communicating a vehicle status signal indicative of a status of the vehicle.

16. The method of claim 15 further comprising supplying electrical power to a vehicle status indicator in communication with the power supply.

17. The method of claim 10 wherein manipulating the power distributor further comprises reducing the vehicle power consumption to a first predefined power shutdown stage.

18. The method of claim 17 wherein reducing the vehicle power consumption further comprises limiting a current draw to a predefined maximum current draw.

19. The method of claim 10 wherein manipulating the power distributor further comprises reducing the vehicle power consumption to a second predefined power shutdown stage.

20. The method of claim 19 wherein reducing the vehicle power consumption further comprises limiting a voltage level drop to a predefined minimum battery voltage level.

21. The method of claim 10 wherein manipulating the power distributor further comprises reducing the vehicle power consumption to a third predefined power shutdown stage.

22. The method of claim 10 wherein manipulating the power distributor further comprises reducing vehicle power consumption after a predefined default time limit has expired.

* * * * *